United States Patent
Petterson et al.

(10) Patent No.: US 9,060,095 B2
(45) Date of Patent: Jun. 16, 2015

(54) MODIFYING AN APPEARANCE OF A PARTICIPANT DURING A VIDEO CONFERENCE

(71) Applicant: GOOGLE INC., Mountain View, CA (US)

(72) Inventors: Frank Petterson, Redwood City, CA (US); Janahan Vivekanandan, Los Altos, CA (US); Thor Carpenter, Snoqualmie, WA (US)

(73) Assignee: Google Inc., Mountain View, CA (US)

( * ) Notice: Subject to any disclaimer, the term of this patent is extended or adjusted under 35 U.S.C. 154(b) by 177 days.

(21) Appl. No.: 13/802,241

(22) Filed: Mar. 13, 2013

(65) Prior Publication Data

US 2013/0242031 A1    Sep. 19, 2013

Related U.S. Application Data

(60) Provisional application No. 61/610,984, filed on Mar. 14, 2012.

(51) Int. Cl.
*H04N 7/14*  (2006.01)
*H04N 7/15*  (2006.01)
*G06K 9/00*  (2006.01)

(52) U.S. Cl.
CPC ............ *H04N 7/157* (2013.01); *G06K 9/00228* (2013.01)

(58) Field of Classification Search
CPC ... G06F 3/017; G06F 3/0304; G06K 9/00228; G06K 9/00248; G06T 15/503; G06T 2207/20064; H04M 2203/1025; H04M 2203/253; H04M 2203/6054; H04M 3/42

USPC ........... 348/14.01, 14.04, 14.07, 14.1, 14.12, 348/14.15
See application file for complete search history.

(56) References Cited

U.S. PATENT DOCUMENTS

| | | | |
|---|---|---|---|
| 6,580,811 B2 * | 6/2003 | Maurer et al. ................. | 382/103 |
| 6,807,563 B1 * | 10/2004 | Christofferson et al. ..... | 709/204 |
| 7,139,767 B1 | 11/2006 | Taylor | |
| 2007/0230794 A1 * | 10/2007 | McAlpine et al. ............ | 382/190 |
| 2010/0073458 A1 | 3/2010 | Pace | |
| 2011/0270609 A1 * | 11/2011 | Jones et al. ................... | 704/235 |
| 2012/0060095 A1 * | 3/2012 | Klappert ....................... | 715/722 |
| 2013/0027503 A1 * | 1/2013 | Hildreth ..................... | 348/14.03 |
| 2013/0147904 A1 * | 6/2013 | Vivekanandan et al. ... | 348/14.08 |
| 2013/0147905 A1 * | 6/2013 | Vivekanandan et al. ... | 348/14.08 |

OTHER PUBLICATIONS

International Search Report, dated May 28, 2013 for related PCT Application No. PCT/US13/31092.

(Continued)

*Primary Examiner* — Binh Tieu
(74) *Attorney, Agent, or Firm* — IP Spring

(57) ABSTRACT

Implementations generally relate to modifying an appearance of a participant during a video conference. In some implementations, a method includes obtaining at least one frame from a media stream, where the at least one frame includes a first face, and where the first face is an image of a face associated with a user. The method also includes determining a plurality of coordinates within the at least one frame. The method also includes obtaining at least one media content item. The method also includes adding the at least one media content item to the at least one frame based on the plurality of coordinates.

20 Claims, 4 Drawing Sheets

(56) References Cited

OTHER PUBLICATIONS

Written Opinion, dated May 28, 2013 for related PCT Application No. PCT/US13/31092.

IP Australia; Patent Examination Report No. 1, corresponding AU patent application No. 2013204970; Jul. 16, 2014.

* cited by examiner

MODIFYING AN APPEARANCE OF A PARTICIPANT DURING A VIDEO CONFERENCE

CROSS-REFERENCE TO RELATED APPLICATIONS

This Application is a non provisional of and claims the benefit of U.S. Provisional Patent Application No. 61/610,984, filed Mar. 14, 2012, the contents of which are all incorporated herein by reference in their entirety.

BACKGROUND

Video conferencing is often used in business settings, and enables participants to share video and audio content with each other in real-time across geographically dispersed locations. A communication device at each location typically uses a video camera and microphone to send video and audio streams, and uses a video monitor and speaker to play received video and audio streams. Video conferencing involves digital compression of video and audio streams, which are transmitted in real-time across a network from one location to another. The communication devices perform the compressing and decompressing of the video and audio streams, and maintain the data linkage via the network.

SUMMARY

Implementations generally relate to modifying an appearance of a participant during a video conference. In some implementations, a method includes obtaining at least one frame from a media stream, where the at least one frame includes a first face, and where the first face is an image of a face associated with a user. The method also includes determining a plurality of coordinates within the at least one frame. The method also includes obtaining at least one media content item. The method also includes adding the at least one media content item to the at least one frame based on the plurality of coordinates.

With further regard to the method, in some implementations, the plurality of first coordinates includes coordinates of the first face. In some implementations, the determining of the plurality of coordinates is performed using a facial recognition algorithm, and the plurality of first coordinates includes coordinates of the first face. In some implementations, the at least one media content item includes at least one substitute face. In some implementations, the at least one media content item includes at least one substitute face, and the substitute face is different from the first face. In some implementations, the at least one media content item includes at least one substitute face, and the substitute face is associated with a person who is different from the user. In some implementations, the at least one media content item includes at least one substitute face, and the substitute face is associated with a cartoon version of the first face. In some implementations, the method further includes obtaining one or more parameters associated with the at least one media content item. In some implementations, the adding of the at least one media content item includes one or more of overlaying the at least one media content item on the at least one frame, and replacing at least a portion of the one or more frames with the at least one media content item. In some implementations, the method further includes obtaining at least one audio content item associated with the at least one media content item, and adding the at least one audio content item to the media stream.

In some implementations, a method includes obtaining at least one frame from a media stream, where the at least one frame includes a first face, and where the first face is an image of a face associated with a user. In some implementations, the method also includes determining a plurality of coordinates within the at least one frame, where the plurality of first coordinates includes coordinates of the first face, and where the determining of the plurality of coordinates is performed using a facial recognition algorithm. In some implementations, the method also includes obtaining at least one media content item, where the at least one media content item includes at least one substitute face, and where the substitute face is associated with a cartoon version of the first face. In some implementations, the method also includes obtaining one or more parameters associated with the at least one media content item. In some implementations, the method also includes adding the at least one media content item to the at least one frame based on the plurality of coordinates, where the adding of the at least one media content item includes one or more of overlaying the at least one media content item on the at least one frame, and replacing at least a portion of the one or more frames with the at least one media content item.

In some implementations, a system includes one or more processors, and logic encoded in one or more tangible media for execution by the one or more processors. When executed, the logic is operable to perform operations including obtaining at least one frame from a media stream, where the at least one frame includes a first face, and where the first face is an image of a face associated with a user. The logic when executed is further operable to perform operations including determining a plurality of coordinates within the at least one frame. The logic when executed is further operable to perform operations including obtaining at least one media content item. The logic when executed is further operable to perform operations including adding the at least one media content item to the at least one frame based on the plurality of coordinates.

With further regard to the system, in some implementations, the plurality of first coordinates includes coordinates of the first face. In some implementations, the determining of the plurality of coordinates is performed using a facial recognition algorithm, and the plurality of first coordinates includes coordinates of the first face. In some implementations, the at least one media content item includes at least one substitute face. In some implementations, the at least one media content item includes at least one substitute face, and the substitute face is different from the first face. In some implementations, the at least one media content item includes at least one substitute face, and the substitute face is associated with a person who is different from the user. In some implementations, the at least one media content item includes at least one substitute face, and the substitute face is associated with a cartoon version of the first face. In some implementations, the logic when executed is further operable to perform operations including obtaining one or more parameters associated with the at least one media content item. In some implementations, the adding of the at least one media content item includes one or more of overlaying the at least one media content item on the at least one frame, and replacing at least a portion of the one or more frames with the at least one media content item. In some implementations, the logic when executed is further operable to perform operations including obtaining at least one audio content item associated with the at least one media content item, and adding the at least one audio content item to the media stream.

DETAILED DESCRIPTION

Implementations described herein enable media streams such as video, audio, and chat streams to be used to simulate a different appearance of a participant during a video conference. For example, a participant may choose to have their likeness or appearance represented by a specific substitute face such as a cartoon face, face of a celebrity, or avatar.

As described in more detail below, in various implementations, a system obtains frames from a media stream, where the frames include the face of a user (e.g., a participant in a video conference). The system also determines coordinates within each of the frames, where the coordinates describe where the face and/or elements of the face are located in each of the frames. The system also obtains one or more media content items, which may include an image of a substitute face (e.g., cartoon face, face of a celebrity, avatar, etc.). The system then adds the one or more media content items to each of frames based on the coordinates.

Figure 1:
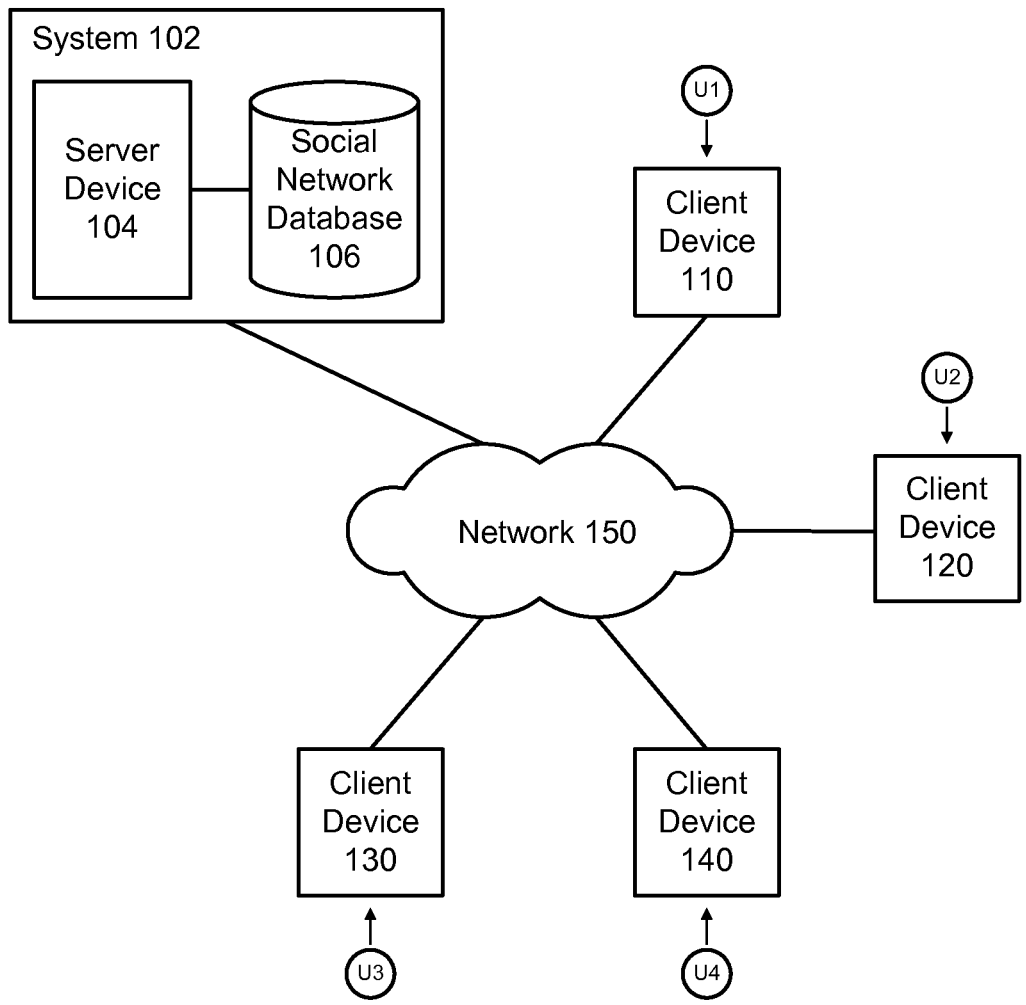
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. The term system 102 and phrase "social network system" may be used interchangeably. Network environment 100 also includes client devices 110, 120, 130, and 140, which may communicate with each other via system 102 and a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may interact with each other in a multi-user video conference, where respective client devices 110, 120, 130, and 140 transmit media streams to each other.

In various implementations, the media streams may include different types of media streams (e.g., one or more video streams and/or one or more audio streams). For example, such media streams may include video streams that display users U1, U2, U3, and U4, and may include associated audio streams. Also, the media streams may include media streams being transmitted in different directions (e.g., one or more outbound streams and/or one or more inbound streams) relative to each client device 110, 120, 130, and 140.

Figure 2:
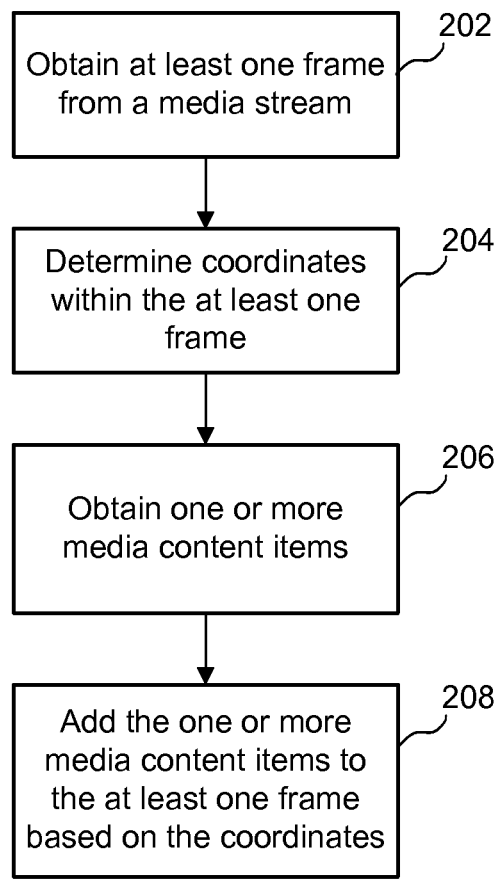
FIG. 2 illustrates an example simplified flow diagram for modifying an appearance of a participant during a video conference, according to some implementations.

FIG. 2 illustrates an example simplified flow diagram for modifying an appearance of a participant during a video conference, according to some implementations. Referring to both FIGS. 1 and 2, a method is initiated in block 202, where system 102 obtains at least one frame from a media stream, where the at least one frame includes a face of a user. In various implementations, the user may be a participant of the video conference. As such, the media stream may be a video stream associated with the video conference.

In the various implementations described herein, the term "face" and the phrase "image of a face" may be used interchangeably, depending on the context. For example, in some contexts (e.g., in the context of a media stream frame), reference to a face may refer to an image of a face of a user in a frame. In some contexts, reference to a face may refer to an actual face, as in the "face of a user."

Figure 3:
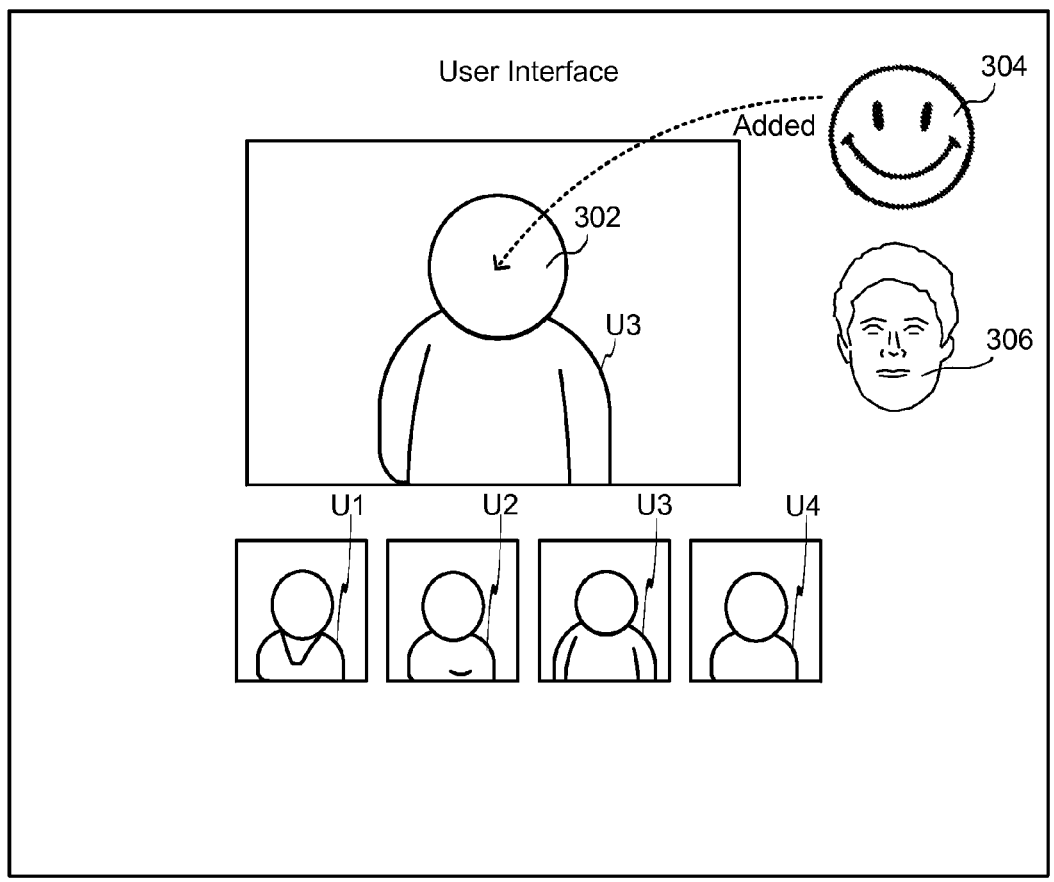
FIG. 3 illustrates an example simplified user interface, according to some implementations.

FIG. 3 illustrates an example simplified user interface 300, according to some implementations. User interface 300 shows aspects of a multi-way video conferencing platform that allows multiple simultaneous participants to communicate over voice, typed chat, and video. User interface 300 may be visually centered on the representation or concept of a current speaker who is shown in the most prominent position (large video feed), and a film strip that shows thumbnails of all of the participants. As shown, a user U3 is among several participants in the video conference, where user U3 is the current speaker. The user interface may also display a chat window that includes a chat log of a typed conversation.

Various implementations described herein are described in the context of a single frame of a media stream. These implementations also apply to multiple frames of a media stream. For example, as indicated above, a given media stream may be a video stream associated to a video conference. As such, system 102 may obtain multiple frames of the video stream and process the image of a given face in each frame of a series of frames according to the various method implementations of FIG. 2.

Referring to both FIGS. 2 and 3, in block 204, system 102 determines coordinates within the at least one frame. In various implementations, the coordinates correspond to locations of a face 302 of the user (e.g., user U3) and/or to portions of the face of the user (e.g., eyes, nose, mouth, etc.). For ease of illustration, a simplified head of user U3 is shown.

In some implementations, system 102 may use a facial recognition algorithm or software to determine coordinates within the frame. The coordinates may include coordinates of the face of the user in a given frame (e.g., a participant's face in a video conference, etc.), and may also include coordinates of elements of the user's face (e.g., eyes, nose, ears, etc.).

As described in more detail below, system 102 enables users of the social network system to specify and/or consent to the use of personal information, which may include system 102 using their faces in photos or using their identity information in recognizing people identified in photos. In some implementations, system 102 may use the facial recognition software to determine whether the participant's mouth is open, closed, smiling, etc., if the participant's eyes are open or closed, etc., as well as other facial characteristics. In some implementations, system 102 may store information associated with the coordinates in a facial library containing information on particular locations and/or distances of facial elements relative to each other, etc.

In block 206, system 102 obtains one or more media content items. As described in more detail, system 102 may substitute the face of the user with the one or more media content items.

In some implementations, the one or more media content items may include a substitute face. In various implementations, the substitute face is an image of a face that system 102 may use to substitute with the image of the user's actual face. In various implementations, the substitute face may be different from the face of the user (e.g., face of a video participant).

In some implementations, the substitute face may be associated with a cartoon version of the face of the user. For example, as shown in FIG. 3, a media content item 304, which is a cartoon face, may be a substitute face. In some implementations, the substitute face may be associated with any avatar. In some implementations, the user may select the substitute face among various substitute faces. In some implementations, the substitute face may be associated with a person who is different from the user. For example, as shown in FIG. 3, a media content item 306, which is different from the face of user U3, may be a substitute face. For example, the substitute face may be the face of a specific celebrity. In some implementations, various substitute faces may be used to make the participant anonymous.

In some implementations, the participant may scan a face of a celebrity, cartoon, avatar, etc. and then upload the face to the social network system. Note that for ease of illustration, the term face is used. In various implementations, the term face may represent the various aspects and perspectives associated with a face or substitute face. For example, the term face may also include elements and portions of a face (e.g., eyes, nose, mouth, facial characteristics, etc.), elements and portions of elements surrounding the face (e.g., ears, neck, etc.), hair elements (e.g., hair covering the head, eyebrows, mustache, beard, etc.). Also, implementations involving a face also apply to these various elements and portions, as well as apply to other body parts that may accompany a face, such as shoulders and chest area, as in a portrait, and arms, hands, etc.

In various implementations, system 102 may also obtain one or more parameters associated with each of the one or more media content items. In various implementations, the one or more parameters are be associated with the one or more media content items. For example, if the media content item is a face or a substitute face, one or more parameters may be associated with and define the size and dimensions of the face, shape of the face, elements of a face and/or associated with a face, etc.

In various implementations, system 102 may obtain one or more media content items and/or obtain one or more parameters associated with the media content item from any suitable storage location (e.g., a local memory).

In block 208, system 102 adds the one or more media content items to the at least one frame based at least in part on the coordinates. For example, media content item 304 of FIG. 3 may be added to the frame, thereby substituting face 302 of user U3. As indicated above, while various implementations are described herein in the context of a single frame, these implementations also apply to multiple frames (e.g., animated frames, etc.). For example, system 102 may add the one or more media content items to a series or stream of frames (e.g., a series of frames in a video stream, such as that shown in FIG. 3).

In some implementations, the adding of the media content item may include system 102 overlaying the at least one media content item on a portion of the frame. In various implementations, the overlaying is based on the coordinates within the frame, and is also based on parameters associated with the one or more media content items. In some implementations, the adding of the media content item may include system 102 replacing a portion of the frame with the one or more media content items. In various implementations, the replacing is based on the coordinates within the frame and based on parameters associated with the one or more media content items.

For example, system 102 may determine where different portions of the user's face are located in the frame (e.g., using the coordinates). System 102 may then determine the parameters of one or more media content items (e.g., eyes, nose, mouth, etc.). System 102 may then substitute a portion of the face of the user or the entire face of the user with one or more media content items. As a result, adding the one or more media content items to a frame may result in replacing the face of the user with a substitute face. In another example, in a video conference, system 102 may substitute the face of a given user in a video stream with a substitute face (e.g., an avatar, a cartoon face, etc.). In various implementations, the user/video conference participant may choose to have the participant's likeness or appearance represented by a variety of specific substitute faces, depending on the user selection.

In some implementations, system 102 may use a facial tracking algorithm to move the substitute face on the screen to follow the user. For example, if the user moves to one side of the video camera (e.g., to the viewer's right), system 102 tracks changes in the coordinates in order to add the one or more media content items appropriately (e.g., to the viewer's right). In some implementations, system 102 may scale the substitute face accordingly. For example, if the user changes distance in relation to the video camera (e.g., moves closer the video camera), system 102 tracks changes in the coordinates, and modifies and adds the one or more media content items appropriately (e.g., enlarges one or more media content items to match the changing coordinates).

In some implementations, system 102 may capture the background of the participant's environment without the participant being present. This would facilitate system 102 when later substituting the participant's face with the substitute face. For example, system 102 may crop out the participants face and insert the substitute face, while preserving the background.

In various implementations, an audio stream may be used to move portions and/or elements of a face, such as the mouth of the substitute face. In some implementations, the audio stream may correspond to words or sounds uttered by the participant. In some implementations, system 102 obtains at least one audio content item associated with the at least one media content item. In some implementations, if the audio content item is a face of a particular celebrity, the audio content may include the voice characteristics of that particular celebrity (e.g., pitch, quality, etc.). In some implementations, system 102 may add the audio content item to the media stream. In some implementations, system 102 may mix the audio content item into the media stream. In some implementations, system 102 may replace at least a portion of the media stream with the audio content item. As a result, as the participant utters words or sounds, system 102 produces the same words or sounds uttered by the user, but modified into the particular celebrity's voice.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

Implementations described herein provide various benefits. For example, implementations enable participants to interact with each other in a fun way. Implementations enable participants in a video conference to be anonymous. Implementations described herein also increase overall engagement among end-users in a social networking environment.

Figure 4:
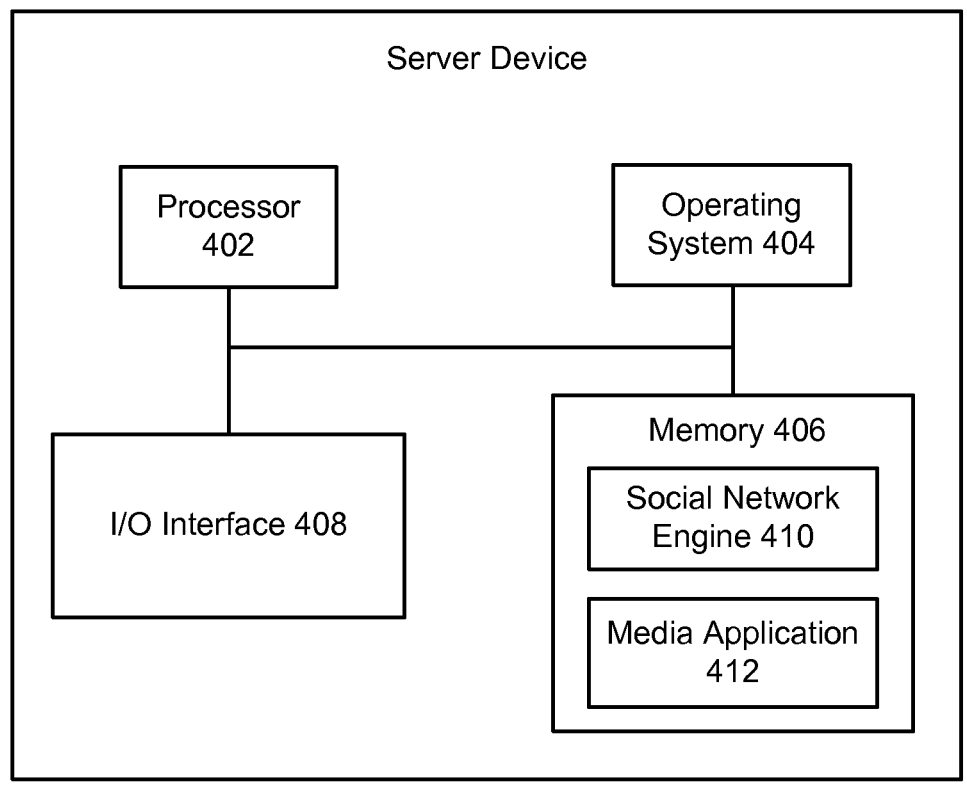
FIG. 4 illustrates a block diagram of an example server device, which may be used to implement the implementations described herein.

FIG. 4 illustrates a block diagram of an example server device 400, which may be used to implement the implementations described herein. For example, server device 400 may be used to implement server device 104 of FIG. 1, as well as to perform the method implementations described herein. In some implementations, server device 400 includes a processor 402, an operating system 404, a memory 406, and an input/output (I/O) interface 408. Server device 400 also includes a social network engine 410 and a media application 412, which may be stored in memory 406 or on any other suitable storage location or computer-readable medium. Media application 412 provides instructions that enable processor 402 to perform the functions described herein and other functions.

For ease of illustration, FIG. 4 shows one block for each of processor 402, operating system 404, memory 406, I/O interface 408, social network engine 410, and media application 412. These blocks 402, 404, 406, 408, 410, and 412 may represent multiple processors, operating systems, memories, I/O interfaces, social network engines, and media applications. In other implementations, server device 400 may not have all of the components shown and/or may have other elements including other types of elements instead of, or in addition to, those shown herein.

In various implementations, system 102 may utilize a variety of recognition algorithms to recognize faces, landmarks, objects, etc. in media. Such recognition algorithms may be integral to system 102. System 102 may also access recognition algorithms provided by software that is external to system 102 and that system 102 accesses.

In various implementations, system 102 enables users of the social network system to specify and/or consent to the use of personal information, which may include system 102 using their faces in photos or using their identity information in recognizing people identified in photos. For example, system 102 may provide users with multiple selections directed to specifying and/or consenting to the use of personal information. For example, selections with regard to specifying and/or consenting may be associated with individual photos, all photos, individual photo albums, all photo albums, etc. The selections may be implemented in a variety of ways. For example, system 102 may cause buttons or check boxes to be displayed next to various selections. In some implementations, system 102 enables users of the social network to specify and/or consent to the use of using their photos for facial recognition in general. Example implementations for recognizing faces and other objects are described in more detail below.

In various implementations, system 102 obtains reference images of users of the social network system, where each reference image includes an image of a face that is associated with a known user. The user is known, in that system 102 has the user's identity information such as the user's name and other profile information. In some implementations, a reference image may be, for example, a profile image that the user has uploaded. In some implementations, a reference image may be based on a composite of a group of reference images.

In some implementations, to recognize a face in a photo, system 102 may compare the face (i.e., image of the face) and match the face to reference images of users of the social network system. Note that the term "face" and the phrase "image of the face" are used interchangeably. For ease of illustration, the recognition of one face is described in some of the example implementations described herein. These implementations may also apply to each face of multiple faces to be recognized.

In some implementations, system 102 may search reference images in order to identify any one or more reference images that are similar to the face in the photo. In some implementations, for a given reference image, system 102 may extract features from the image of the face in a photo for analysis, and then compare those features to those of one or more reference images. For example, system 102 may analyze the relative position, size, and/or shape of facial features such as eyes, nose, cheekbones, mouth, jaw, etc. In some implementations, system 102 may use data gathered from the analysis to match the face in the photo to one more reference images with matching or similar features. In some implementations, system 102 may normalize multiple reference images, and compress face data from those images into a composite representation having information (e.g., facial feature data), and then compare the face in the photo to the composite representation for facial recognition.

In some scenarios, the face in the photo may be similar to multiple reference images associated with the same user. As such, there would be a high probability that the person associated with the face in the photo is the same person associated with the reference images.

In some scenarios, the face in the photo may be similar to multiple reference images associated with different users. As such, there would be a moderately high yet decreased probability that the person in the photo matches any given person associated with the reference images. To handle such a situation, system 102 may use various types of facial recognition algorithms to narrow the possibilities, ideally down to one best candidate.

For example, in some implementations, to facilitate in facial recognition, system 102 may use geometric facial recognition algorithms, which are based on feature discrimination. System 102 may also use photometric algorithms, which are based on a statistical approach that distills a facial feature into values for comparison. A combination of the geometric and photometric approaches could also be used when comparing the face in the photo to one or more references.

Other facial recognition algorithms may be used. For example, system 102 may use facial recognition algorithms that use one or more of principal component analysis, linear discriminate analysis, elastic bunch graph matching, hidden Markov models, and dynamic link matching. It will be appreciated that system 102 may use other known or later developed facial recognition algorithms, techniques, and/or systems.

In some implementations, system 102 may generate an output indicating a likelihood (or probability) that the face in the photo matches a given reference image. In some implementations, the output may be represented as a metric (or numerical value) such as a percentage associated with the confidence that the face in the photo matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

Although the description has been described with respect to particular embodiments thereof, these particular embodiments are merely illustrative, and not restrictive. Concepts illustrated in the examples may be applied to other examples and implementations.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A method for use during a video conference, the method comprising:
   obtaining at least one frame from a media stream, wherein the at least one frame includes a first face, wherein the first face is an image of a face of a user;
   determining a plurality of first coordinates within the at least one frame, wherein the plurality of first coordinates includes coordinates of the first face, and wherein the determining of the plurality of first coordinates is performed using a facial recognition algorithm;
   obtaining one or more first media content items, wherein the one or more first media content items include at least one second face, and wherein the at least one second face is a cartoon version of the first face; and
   adding the one or more first media content items to the at least one frame based on the plurality of first coordinates, wherein the adding of the one or more first media content items includes one or more of overlaying the one or more first media content items on the at least one frame and replacing at least a portion of the at least one frame with the one or more first media content items;
   obtaining at least one audio content item, wherein the at least one audio content item is associated with the one or more first media content items; and
   adding the at least one audio content item to the media stream.

2. A method for use during a video conference, the method comprising:
   obtaining at least one frame from a media stream, wherein the at least one frame includes a first face, and wherein the first face is an image of a face of a user;
   determining a plurality of first coordinates within the at least one frame;
   obtaining one or more first media content items;
   adding the one or more first media content items to the at least one frame based on the plurality of first coordinates;
   obtaining at least one audio content item, wherein the at least one audio content item is associated with the one or more first media content items; and
   adding the at least one audio content item to the media stream.

3. The method of claim 2, wherein the plurality of first coordinates includes coordinates of the first face.

4. The method of claim 2, wherein the determining of the plurality of first coordinates is performed using a facial recognition algorithm, and wherein the plurality of first coordinates includes coordinates of the first face.

5. The method of claim 2, wherein the one or more first media content items include at least one second face.

6. The method of claim 2, wherein the one or more first media content items include at least one second face, and wherein the at least one second face is different from the first face.

7. The method of claim 2, wherein the one or more first media content items include at least one second face, and wherein the at least one second face is associated with a person who is different from the user.

8. The method of claim 2, wherein the one or more first media content items include at least one second face, and wherein the at least one second face is associated with a cartoon version of the first face.

9. The method of claim 2, further comprising obtaining one or more parameters associated with the one or more first media content items.

10. The method of claim 2, wherein the adding of the one or more first media content items comprises one or more of:
    overlaying the one or more first media content items on the at least one frame; and
    replacing at least a portion of the one or more frames with the one or more first media content items.

11. The method of claim 2,
    wherein the at least one audio content item corresponds to sounds uttered by the user.

12. A system for use during a video conference, the system comprising:
    one or more processors; and
    logic encoded in one or more tangible media for execution by the one or more processors and when executed operable to perform operations comprising:
    obtaining at least one frame from a media stream, wherein the at least one frame includes a first face, and wherein the first face is an image of a face of a user;
    determining a plurality of first coordinates within the at least one frame;
    obtaining one or more first media content items;
    adding the one or more first media content items to the at least one frame based on the plurality of coordinates;
    obtaining at least one audio content item, wherein the at least one audio content item is associated with the one or more first media content items; and adding the at least one audio content item to the media stream.

13. The system of claim 12, wherein the plurality of first coordinates includes coordinates of the first face.

14. The system of claim 12, wherein the determining of the plurality of first coordinates is performed using a facial recognition algorithm, and wherein the plurality of first coordinates includes coordinates of the first face.

15. The system of claim 12, wherein the one or more first media content items include at least one second face.

16. The system of claim 12, wherein the one or more first media content items include at least one second face, and wherein the at least one second face is different from the first face.

17. The system of claim 12, wherein the one or more first media content items include at least one second face, and wherein the at least one second face is associated with a person who is different from the user.

18. The system of claim 12, wherein the one or more first media content items include at least one second face, and wherein the at least one second face is associated with a cartoon version of the first face.

19. The system of claim 12, further comprising obtaining one or more parameters associated with the one or more first media content items.

20. The system of claim 12, wherein the adding of the one or more first media content items comprises one or more of:
   overlaying the one or more first media content items on the at least one frame; and
   replacing at least a portion of the one or more frames with the one or more first media content items.

* * * * *